United States Patent [19]

Arai

[11] Patent Number: 5,040,017
[45] Date of Patent: Aug. 13, 1991

[54] SHUTTER APPARATUS HAVING TWO BLADE MEMBERS PIVOTED ABOUT ONE POINT

[75] Inventor: Akihiro Arai, Sakado, Japan

[73] Assignee: Asahi Kogaku Kogyo Kabushiki Kaisha, Tokyo, Japan

[21] Appl. No.: 533,478

[22] Filed: Jun. 5, 1990

[30] Foreign Application Priority Data

Jun. 5, 1989 [JP] Japan .................................. 1-142658
Jun. 5, 1989 [JP] Japan .................................. 1-142659
Oct. 6, 1989 [JP] Japan .................................. 1-260091

[51] Int. Cl.⁵ .......................... G03B 7/08; G03B 9/20; G03B 9/02
[52] U.S. Cl. .................................. 354/439; 354/262; 354/274
[58] Field of Search .............. 354/439, 230, 243, 247, 354/262, 264, 265, 274, 250

[56] References Cited

U.S. PATENT DOCUMENTS

4,648,701 3/1987 Ogihara et al. ..................... 354/439
4,864,346 9/1989 Shinozaki et al. .................. 354/439

Primary Examiner—W. B. Perkey
Assistant Examiner—Cassandra C. Spyrou
Attorney, Agent, or Firm—Sandler, Greenblum, & Bernstein

[57] ABSTRACT

A shutter mechanism, employed in a camera, is provided having a pair of blade members pivoted about a point. The blade members are moved between a position where the light path is completely shielded and another position where light is allowed to pass through. Each of the blade members has a gear portion, and gear members transmit a driving force from a pulse motor to the gear portions to move the blade members toward and away from each other. Further, the width of the pulses to be applied to the motor is varied corresponding to the revolution of the motor, and the phase of the pulse is temporarily reversed corresponding to certain aperture values. Furthermore, a reverse rotation pulse is applied to the motor at the end of the revolution of the motor for preventing the motor from overrunning. When the blade members are moved to form the opening corresponding to a predetermined aperture value, another pulse is applied to the motor for the period of time corresponding to exposure time in order to hold the opening for the period of time.

16 Claims, 12 Drawing Sheets

FIG. 8

SHUTTER APPARATUS HAVING TWO BLADE MEMBERS PIVOTED ABOUT ONE POINT

BACKGROUND OF THE INVENTION

The present invention relates to a two-blade shutter mechanism for opening and closing a light path by swingingly moving two shutter blades. More particular, the invention relates to a two blade shutter mechanism employing a pulse motor for driving the two shutter blades.

Generally, a so-called two-blade shutter mechanism which opens and closes a light path by swingingly moving two shutter blades is employed in cameras, especially in the 35 mm lens shutter type cameras.

Although the driving action of such a two-blade shutter, that is, the swinging action of the shutter blades, has been conventionally carried out by a spring, recently two-blade shutter mechanism driven by a motor have been developed.

Nevertheless, even if a two-blade shutter is driven by a motor, the system has such a direct shutter swinging mechanism that, for example, two shutter blades are independently swingingly pivoted. A pin protruding from a reciprocally driven lever is caused to pass through a slot defined at the position where the two blades are overlapped, and the shutter blades are swingingly driven by the reciprocal sliding action of the lever through the pin. In this case, the rotational force of the motor is converted into the reciprocal sliding action of the lever.

Further, in the shutter mechanism in which the shutter blades also act as a diaphragm, the shutter blades are generally driven by a pulse motor as the motor described above.

Furthermore, as a drive control method of the pulse motor, there is proposed a control circuit such that the number of pulses in accordance with an exposure time and an aperture are determined, and the motor is rotated in the forward direction corresponding to the number of set pulses when a shutter is opened. The pulse motor is then rotated in the reverse direction when a period of time corresponding to an exposure time has passed from the time at which the final drive pulse forwardingly drives to rotate the motor is applied, whereby a proper amount of exposure is obtaind (refer to Japanese Patent Provisional Publication SHO No. 60-254027). In this control circuit, however, pulses having a predetermined width are always applied to drive the pulse motor.

The above prior art arrangement, however, has a problem in that although the rotation of the motor as a driving source can be very effectively reduced and transmitted by a gear train, it is converted into a sliding movement of the lever at the final stage to swingingly drive the shutter blades and thus the rotational force is very ineffectively transmitted. That is, the driving force of the motor cannot be effectively converted and utilized, which results in the shutter being difficult to be actuated at a high speed and large electrical power is consumed (battery life becomes short).

In addition, the structure of the shutter mechanism described above is complex and the manufacturing cost is also high.

Further, when drive pulses having a predetermined width are used, a pulse width which does not cause so-called step out of the motor at an initial drive (from an initial speed 0 to a time at which driving of the pulse motor starts) should be selected. Thus a slightly longer pulse width than required is set, and thus there is a problem that the operatng time of the shutter is prolonged.

It is generally known that when a pulse motor is energized, damped oscillation is caused by electromagnetic absorption, inertia and frictional resistance before and after the energizing.

Figure 1:
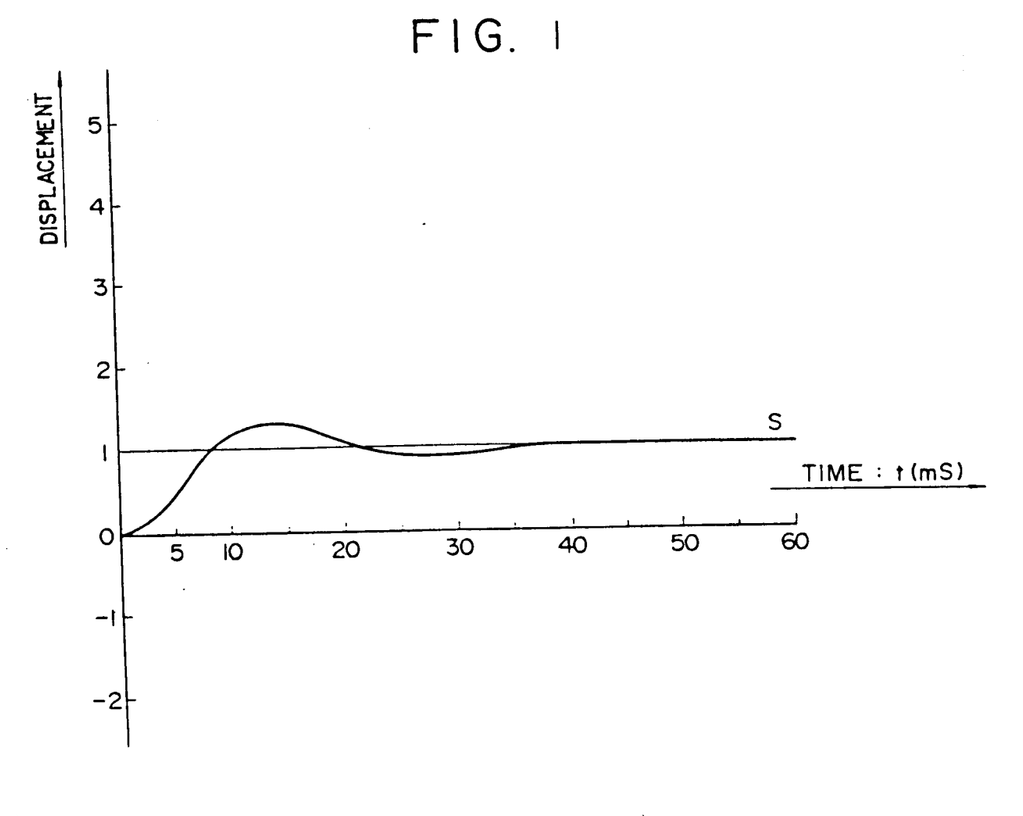
FIG. 1 is a diagram explaining the general relationship between the rotational displacement of a pulse motor and time.

FIG. 1 shows an example of damped oscillation of a pulse motor, wherein the horizontal axis represents time and a vertical axis represents displacement. The time necessary for the pulse motor to be stabilized to a constant pulse position S is shown in FIG. 1 when the pulse motor is driven by one pulse commencing at zero seconds.

As shown in FIG. 1 when a drive pulse is applied, the motor oscillates past the stabilizing position S, again returns there and gradually converges on the stabilizing position S. Therefore, a considerable amount of time lapses before the motor converges on this stabilizing position S. When pulses are continuously applied, this damped oscillation occurs for each of the applied pulses. It is possible, however, that an electromagnetic force is changed for the next step when a displacing speed is relatively large at a very early stage of the damped oscillation and thus moves to the next step in a short time using inertia. When this change is not effected timely, however, so-called step out occurs and the motor moves to a position apart from a target position. The term "step out" refers to a position of the motor shaft displaced by one or more steps from a desired position desired, which is based upon the number of pulses applied.

Figure 2A:
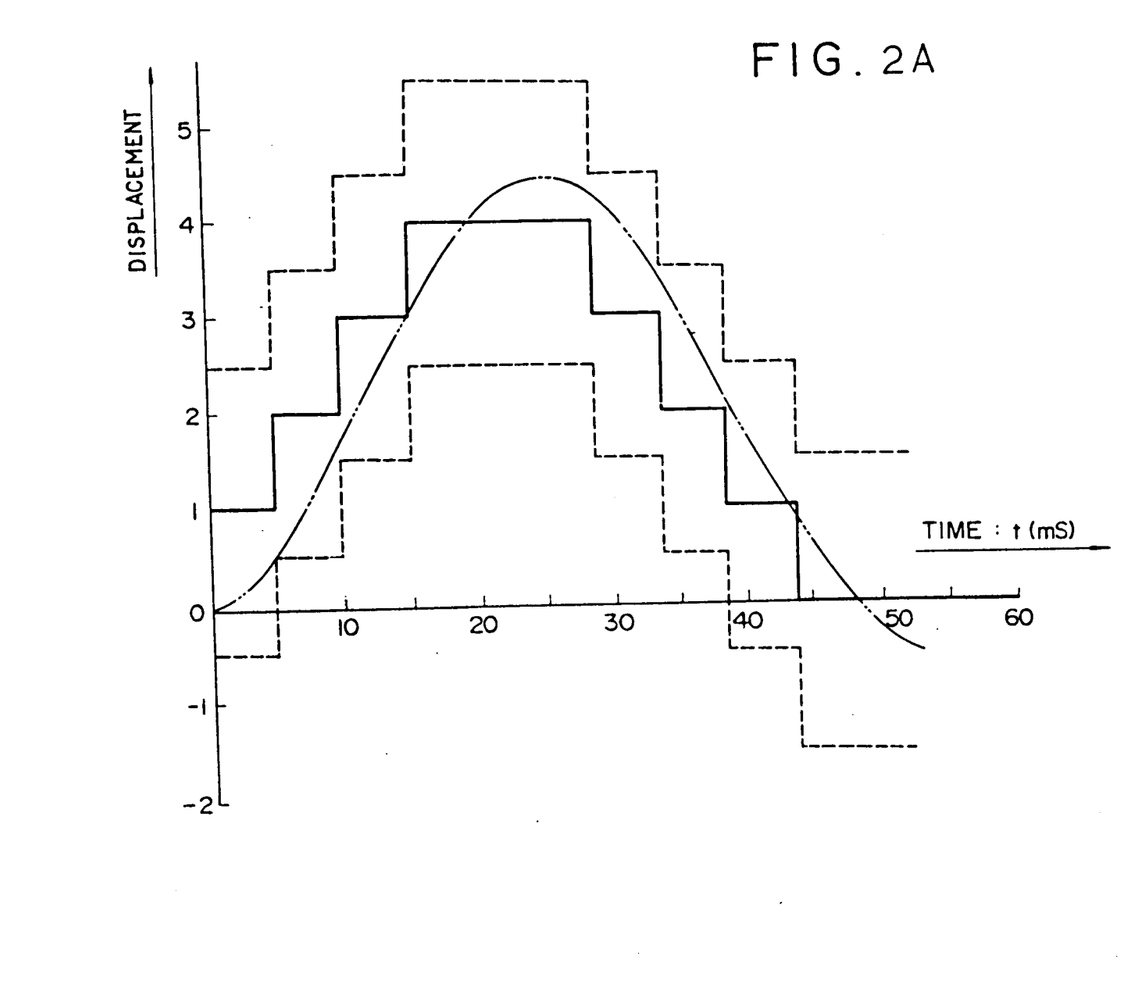
FIGS. 2A and 2B are diagrams explaining the conventional relationship between the rotational displacement of a pulse motor and time when a predetermined pulse width is used.

FIG. 2A shows an example of a pulse motor which is driven by a predominant pulse width of 5 ms.

Stabilizing positions at the time are moved stepwise in accordance with each pulse (shown by solid lines in FIG. 2A). Ideally, when pulses are applied along these steps, movable members (shutter blades) are smoothly moved in a short time and securely stopped. In practice, however, the previously mentioned oscillation occurs, and thus the moveable members (i.e., shutter blades) are moved with delay and advance with respect to the stabilizing positions.

Generally, in a case of a three-phase drive motor, when the delay or advance corresponding to 1.5 pulses or more is caused (shown by dashed lines in the figure) step out arises, which causes leaving out of steps or reverse rotation, resulting in displacement different from a set displacement as predetermined by the number of pulses.

Figure 2B:
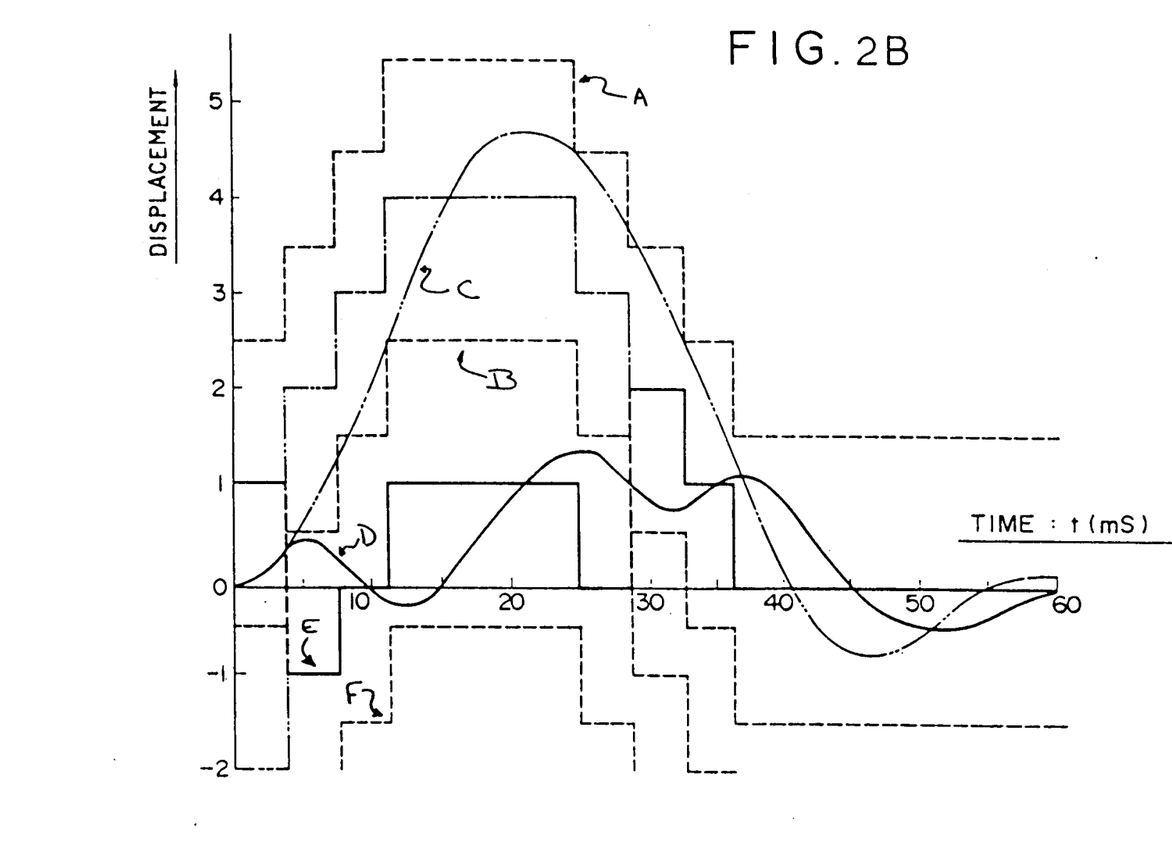

FIG. 2B shows another example in which the pulse width applied to the pulse or step motor is shortened to 3.75 ms, wherein although a moving pattern from 0 to 3.75 ms is the same as FIG. 2A, an amount of movement is smaller because of the shortened pulse width and thus when a second pulse is applied, a delay of 1.5 pulses or more is caused with respect to the stabilizing position corresponding to the pulse. Therefore, the pulse motor is caused to be rotated in a reverse direction (along curve D) when the second pulse is applied, and the motor originally intended to be moved to a displacement 2 (along curve C) is moved toward a displacement −1, as if the intended position is defined by pulses along line E, and the motor is positioned between the lower dashed lines B and F. That is, since this movement is out of the area defined by the upper two dashed lines (A and B) in FIG. 2B, which show the area originally intended, step out of the motor arises.

As described above, conventionally, if a pulse width is reduced in order to shorten an operating time, step out is caused, since damped oscillation occurs particularly at the beginning of driving. To cope with this problem, a predetermined pulse width a little longer than required is set within a range in which no step out is caused in accordance with the characteristics of a motor, and the motor is driven with the predetermined pulse width. As a result, a problem arises in that an operating time is increased. In addition, a conventional motor typically overruns due to inertia when a pulse phase is reversed (e.g., to enable a shutter to move from an opening operation to a closing operation). Therefore, a problem arises in that a set aperture is not stable. Further, since the shutter is not securely stopped when the closing operation is completed, the shutter bounds when the operation thereof is completed, and the like.

SUMMARY OF THE INVENTION

Taking the above into consideration, it is therefore an object of the present invention to provide a two-blade shutter mechanism capable of effectively driving shutter blades by a motor through a simple arrangement, actuating them at a high speed, improving battery life, and reducing manufacturing cost.

It is another object of the present invention to provide a camera employing a two-blade shutter mechanism in which the operating time of the shutter actuated by a pulse motor is shortened to enable the shutter to operate at a high speed. The shutter is quickly stabilized to a set aperture and causes no rebounding after it is closed.

For the above objects, according to one aspect of the invention, there is provided a shutter mechanism employed in a camera for opening and closing a light path.

The mechanism includes a pair of plate members pivoted at the same position which are swingingly driven into at their operative positions between positions where the plate members completely shield the light path and positions where the plate members allow light to pass through the light path. Each of the plate members have an arc-shaped gear portion.

A driving device is provided for supplying a driving force to drive the plate members, and a gear train is arranged between the driving device and the pair of plate members for transmitting the driving force to the gear portions of the plate members.

According to another aspect of the invention, there is provided a camera employing a two-blade shutter mechanism. The camera a pulse motor for driving two blade members of the two-blade shutter mechansim; and a control mechanism for varying the width of pulses to be applied to the motor in such a manner that a pulse of relatively large width is applied at the beginning of the revolution of the motor, and thereafter pulses of relatively small width are applied.

DESCRIPTION OF THE ACCOMPANYING DRAWINGS

FIGS. 4A and 4B show a modification of the first embodiment according to the present invention, wherein

DESCRIPTION OF THE EMBODIMENTS

Figure 3A:
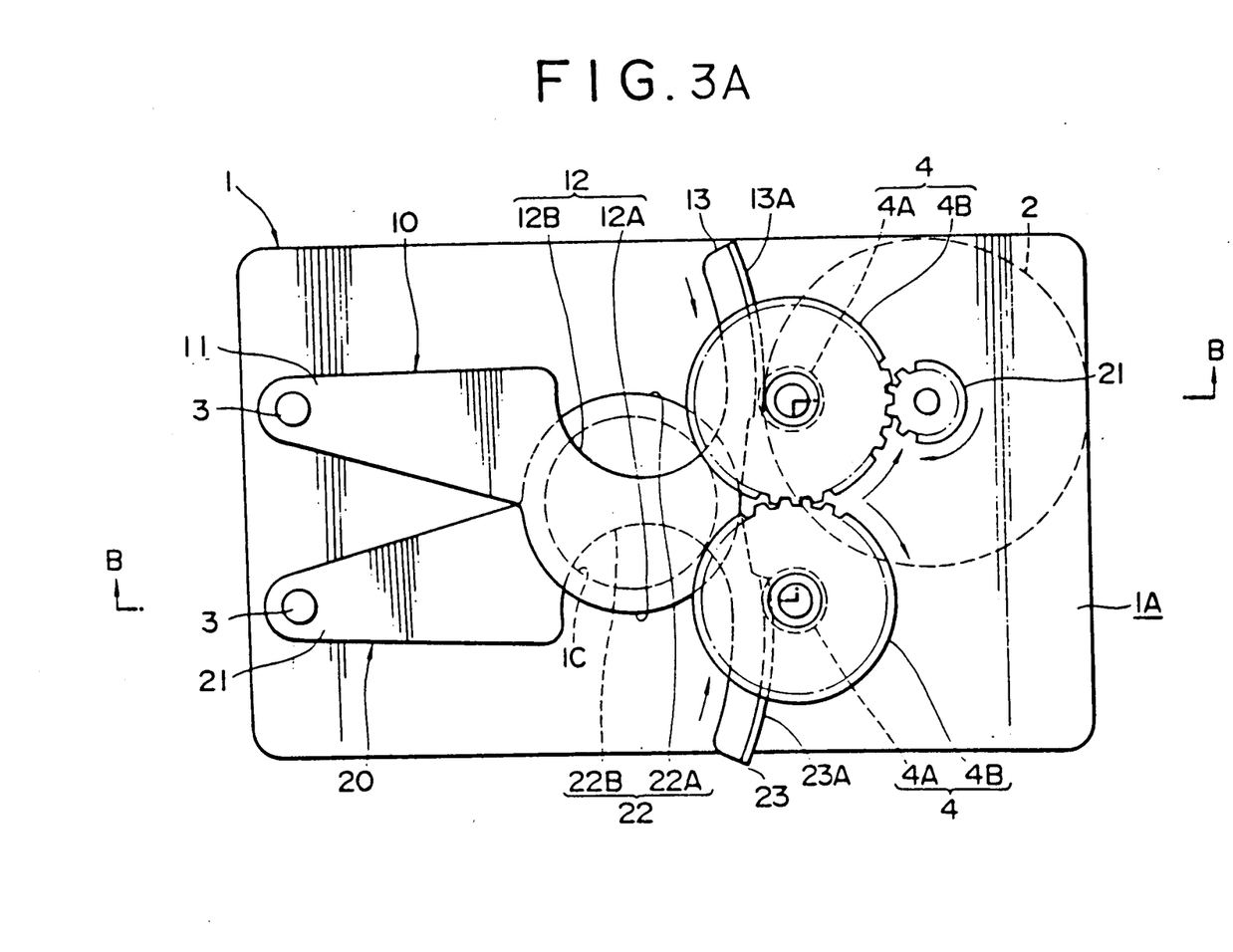
FIG. 3A is a plan view of a first embodiment of a two-blade shutter mechanism according to the present invention.
Figure 3B:
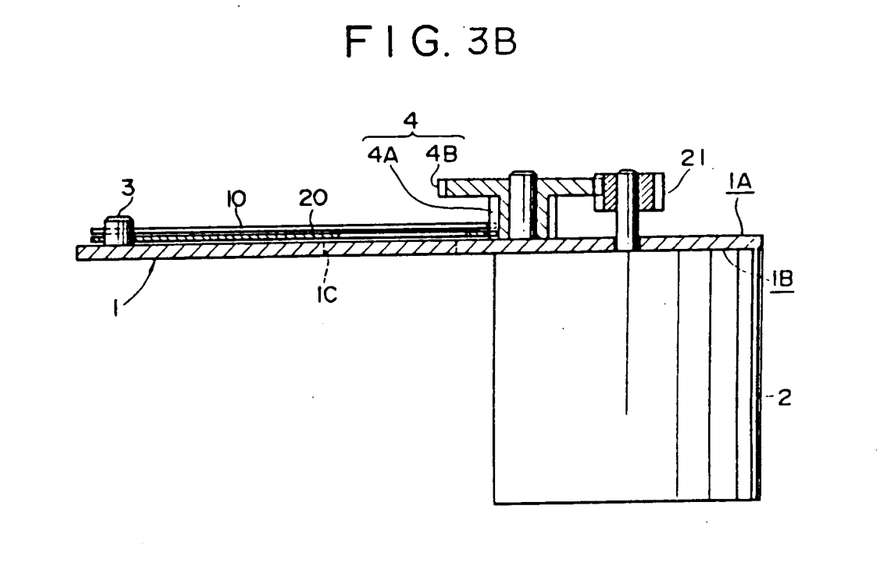
FIG. 3B is a vertical cross sectional view of the two-blade shutter mechanism of FIG. 3A.

FIGS. 3A and 3B show a two-blade shutter mechanism according to the present invention, wherein FIG. 3A is a plan view and FIG. 3B is a cross sectional view thereof.

The illustrated shutter mechanism comprises a pair of shutter blades 10, 20 swingably attached, to one side (front surface 1A) of a base plate 1. A pulse motor 2 fixed to the other side (back surface 1B) of base plate 1, acts as a driving means for driving the two shutter blades 10, 20.

The base plate 1 has a circular opening 1C defining a light path at substantially the center thereof. In addition, a pair of fulcrum pins 3, 3 are disposed at one end of the base plate 1 and the shutter blades 10, 20 are swingingly pivoted by the fulcrum pins 3, 3 at one end thereof, respectively.

The two shutter blades 10, 20 are symmetrically shaped with respect to each other, and provided with arm portions 11, 21, crescent-shaped shielding portions 12, 22 in front thereof, and gear portions 13, 23 formed by extending the extreme ends of the shielding portions 12, 22, respectively.

The shielding portions 12, 22 have circular projections 12A, 22A and cutouts 12B, 22B corresponding to the shape of the opening 1C and formed to be cresent-shaped at the opposite side edges thereof, as described above.

The shielding portions 12, 22 of the shutter blades 10 and 20 mounted on the base plate 1 correspond to the opening 1C of the base plate 1 and the arms 11, 21 have edges swingably pivoted by the fulcrum pins 3, 3, respectively.

When the shutter blade 10 on the one side is disposed such that the shielding portion 12 thereof is caused to correspond to the opening 1C of the base plate 1, the opening 1C is partially shielded by the projection 12A, whereas a gap is created at the portion where the cutout 12B overlaps with the opening 1C. Thus the opening 1C cannot be covered as a whole by a single shielding portion 12, but the projection 22A of the shutter blade 20 on the other side overlaps the gap, causing the opening 1C to be fully covered.

The external edges of the gear portions 13, 23 extending from the shielding portions 12, 22 are formed in an arc shape centered about the pivot points (fulcrum pins 3, 3) of the shutter blades 10, 20 and rack gears 13A, 23A are formed thereto.

Gears 4, 4 are disposed at positions of the base plate 1 corresponding to the gear portions 13, 23 of the shutter blades 10, 20, respectively.

Each of the gears 4 is composed of a lower gear 4A having a smaller number of teeth and an upper gear 4B with a larger number of teeth, which together form a two-stage gear. The gears 4 are rotatably mounted on the base plate 1 in such a manner that the upper gears 4B, 4B are meshed with each other and the lower gears 4A, 4A are meshed with the rack gears 13A, 23A, respectively.

Further, one of the gears 4B of a gear 4 is meshed with the drive gear 21 which is fixed to the shaft of the pulse motor 2. The shaft of the motor passes through the base plate 1 and projects to the front surface 1A of the base plate 1.

The rotation of the pulse motor 2 enables the gears 4, 4 to rotate in an opposite direction with respect to each other through the drive gear 21 so that the shutter blades 10, 20 (the rack gears 13A, 23A of the gear portions 12, 23 being meshed with the gears 4) 4, are swingingly driven in a direction opposite to each other.

The shutter unit arrangement as described above, operates as below.

Figure 3C:
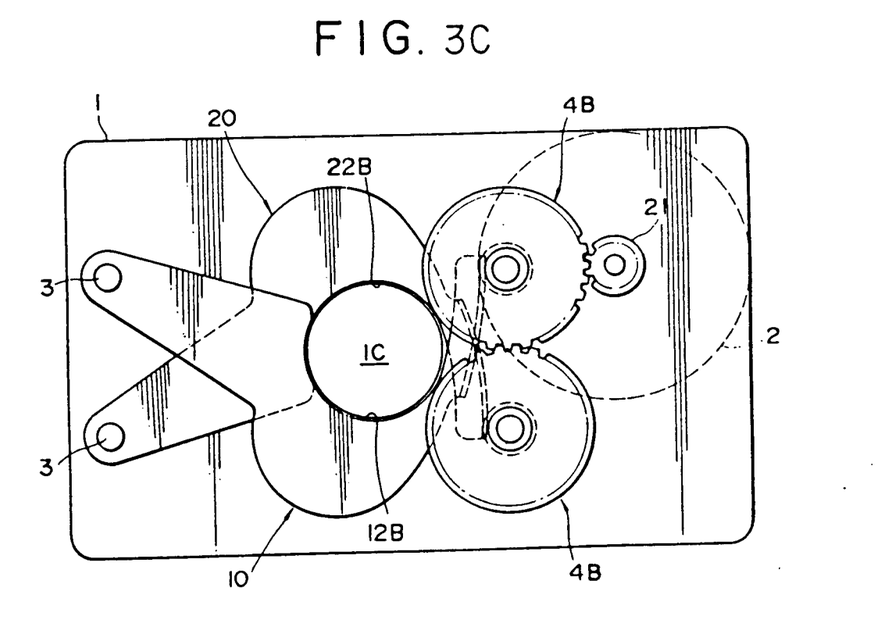
FIG. 3C is a plan view showing a fully opened state of the shutter mechanism of FIG. 3A.

As show in FIG. 3A, the shutter blades 10, 20 are initially in a state such that the opening 1C of the base unit 1 is completely covered by the shielding portions 12, 22. Then, the pulse motor 2 is rotated a predetermined amount (or angle) in the direction shown by an arrow in FIG. 3A. This causes the shutter blades 10, 20 to swingingly retract so that the cutouts 12B and 22B of the shielding portions 12, 22 correspond to the opening 1C. Thus, the shielding of the opening 1C is removed (i.e., the shutter is opened) as shown in FIG. 3C. Then, after a predetermined time (exposure time) has passed, the pulse motor 2 is rotated in the reverse direction by the same amount as for opening the shutter. The blades are returned to the initial state (natural state) and the opening 1C is again shielded (i.e., the shutter is closed).

Figure 4A:
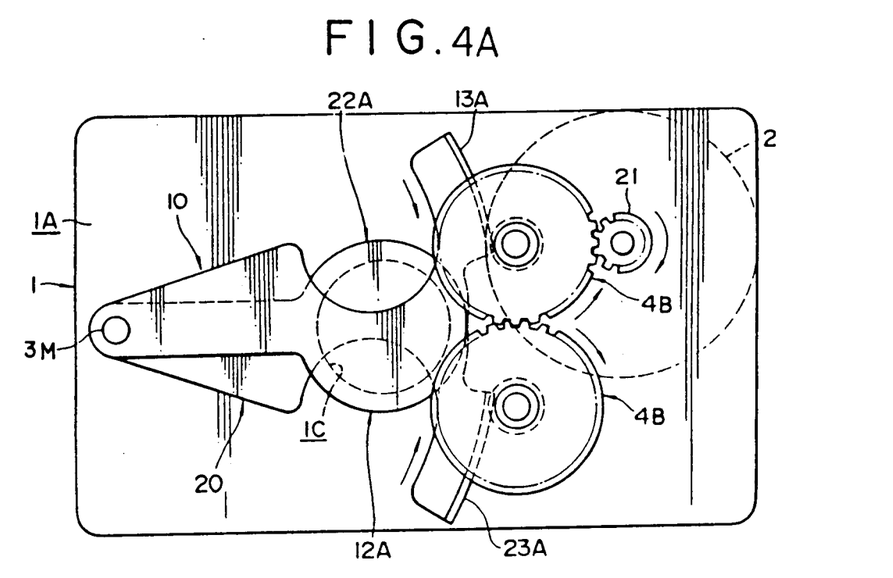
FIG. 4A shows a closed stated and FIG. 4B shows an opened state.
Figure 4B:
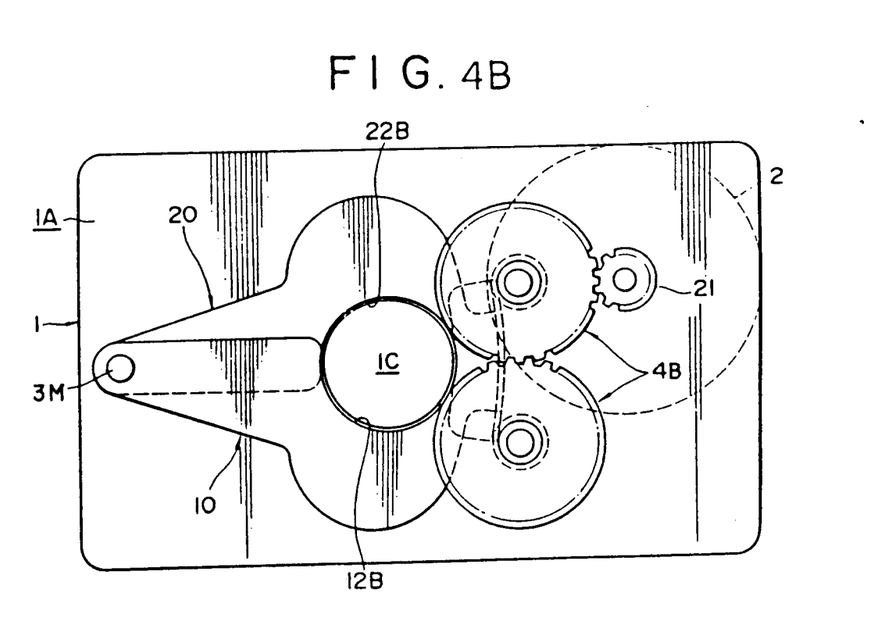

FIGS. 4A and 4B show a modification of the first embodiment of the present invention. Those parts having the same function as those of the first embodiment are designated by identical reference numerals.

Although the above first embodiment has the shutter blades 10, 20 independently pivoted onto the base plate 1 by the pair of fulcrum pins 3, 3, this embodiment has shutter blades pivoted by a single pin 3M.

More specifically, in the first embodiment, the shutter blades 10, 20 and the gears 4, 4 are disposed symmetrically with respect to a straight symetry line bisecting a line connecting the centers of fulcrum pins 3, 3 and passing the center of the opening 1C. In the modification illustrated in FIGS. 4A and 4B, the fulcrum pin 3M is disposed on the symmetry line to enable the shutters 10, 20 to be supported by the single fulcrum pin 3M. The arrangement and the operation of the modification are the same as the first embodiment.

As previously mentioned, with the two shutter blades 10, 20 pivoted by a single pin 3M, the shutter mechanism can be simplified and made compact.

Figure 5A:
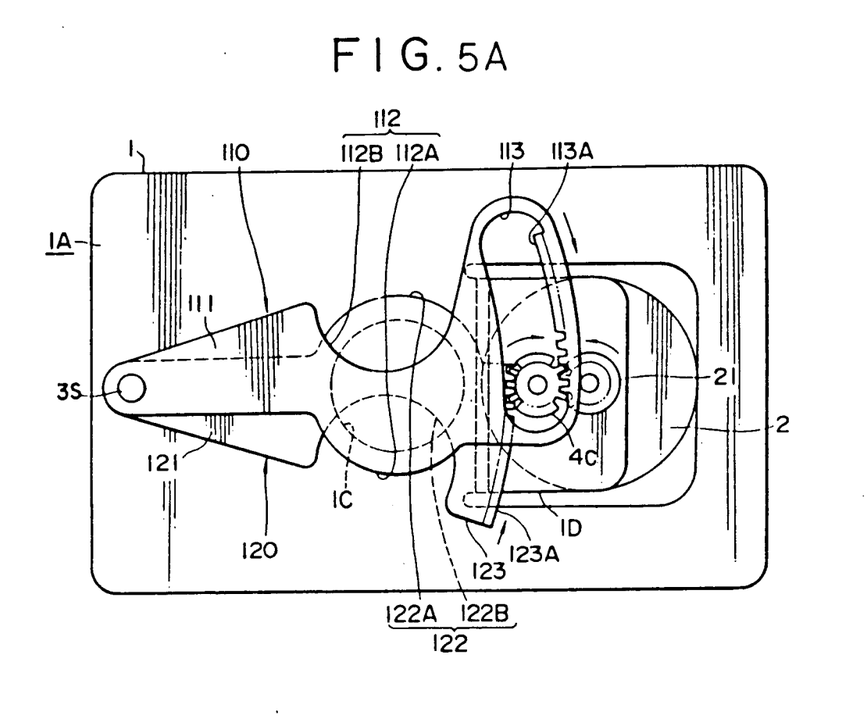
FIG. 5A is a plan view of a second embodiment of a two-blade shutter mechanism according to the present invention.
Figure 5B:
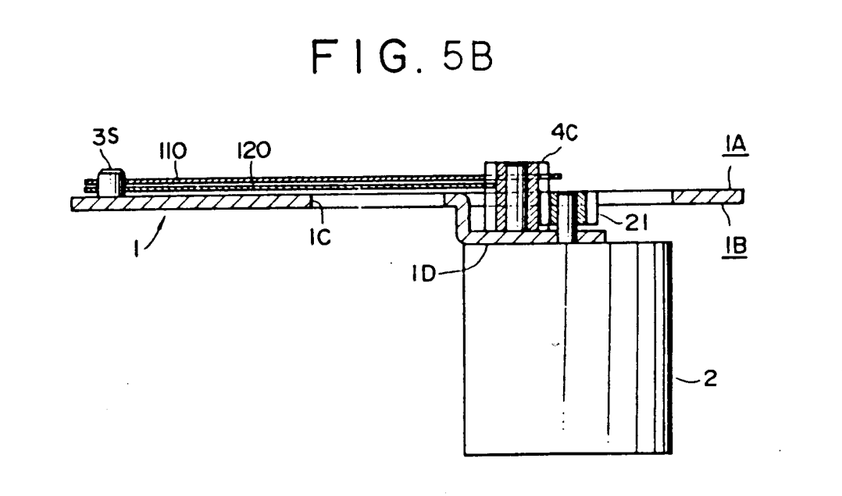
FIG. 5B is a vertical cross sectional view of the shutter mechanism of FIG. 5A.
Figure 5C:
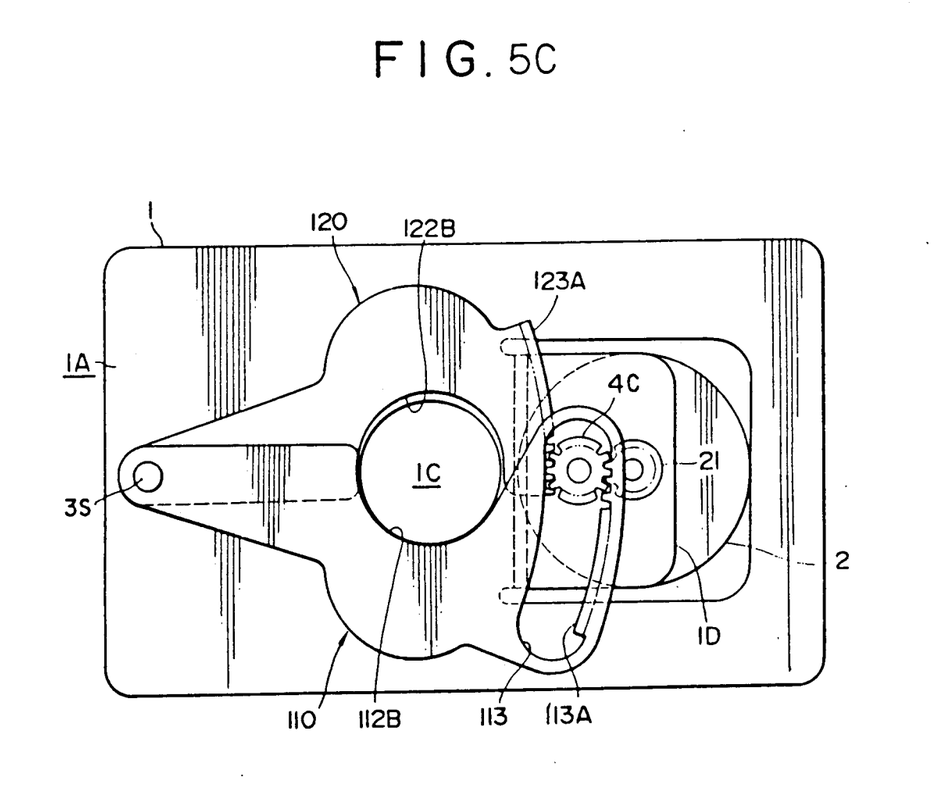
FIG. 5C is a plan view showing a fully opened state of the shutter mechanism of FIG. 5A.

FIGS. 5A and 5B show a second embodiment of a two-blade shutter mechanism according to the present invention, wherein FIG. 5A is a plan view and FIG. 5B is a cross sectional view thereof.

The illustrated shutter unit comprises two shutter blades 110, 120 swingably attached to the front surface 1A of the base plate 1. The pulse motor 2, acting as a driving means, is fixed to the back surface 1B thereof.

The base plate 1 has a circular opening 1C defining a light path at substantially the center thereof, A step motor mounting portion 1D is formed on the back surface 1B of base plate 1 in the vicinity of the edge of the opening 1C. In addition, a support pin 3S is disposed at one side of the base plate 1 and the shutter blades 110, 120 are each pivoted by the support pin 3S at one end thereof.

The shutter blade 110 at the one side is provided with an arm portions 111, a crescent-shaped shielding portion 112 disposed in front thereof. An arc slot 113 is defined along an arc about the pivot point (support pin 3S) on the extreme end side of the shutter blade 110, and an inner rack gear 113A is defined along the outside (side farthest from the pivoted point) edge of the inner circumference of the slot 113.

The shutter blade 120 is provided with an arm portion 121 and a shielding portion 122, each having a configuration symmetrical to that of the shutter 110 (i.e., a reversed configuration thereof). The outside edge of the extreme end 123 of the shielding portion 122 is formed as an arc shape about the pivot point thereof (support pin 3S) and an outer rack gear 123A is defined thereon. The shielding portions 112, 122 of both the shutter blades 110, 120 are formed to be crescent-shaped. Circular projections 112A and 122A correspond to the opening 1C of the base plate, and cutouts 112B, 122B are defined at side edges opposite the respective circular projections 112A and 112A. The shutter blades 110 and 120 are pivoted on the base plate 1 by the support pin 3S, and the arms 111, 121 with the shielding portions 112, 122.

When the shutter blade 110 at one side is disposed such that the shielding portion 112 thereof corresponds to the opening 1C of the base plate 1, the opening 1C is partially covered by the projection 112A leaving a gap at the portion where the cutout 112B overlaps with the opening 112B. Thus the complete opening 1C is not covered by one shutter blade. The projection 122A of the shutter blade 120 at the other side overlaps the remaining gap, with the result that the opening 1C is fully covered.

A drive gear 4C is rotatably attached at a predetermined position on the front surface of the motor mounting portion 1D of the base plate 1. At its predetermined position, the drive gear 4C, is inserted into the slot 113 of the shutter blade 110 and meshed simultaneously the inside rack gear 113A thereof and the outside rack gear 123A of the shutter blade 120.

The shaft of pulse motor 2 passes through the motor mounting portion 1D and projects to the front side thereof. Drive gear 4C is meshed with a gear 21 fixed to the projecting portions of the shaft of the pulse motor 2 which is mounted on the back side of the motor mounting portion 1D.

The rotation of the pulse motor 2 causes the drive gear 4C to be rotated via the gear 21. Consequently, since the inside rack gear 113A and the outside rack gear 123A are meshed with the drive gear 4C, the shutter blades 110, 120 are swingingly driven in opposite directions.

The shutter unit arranged as above operates as described below.

As shown in FIG. 5A, the shutter blades 110, 120 are placed in an initial state such that the opening 1C of the base plate 1 is completely covered by the shielding portions 112, 122. Then, the pulse motor 2 is rotated a predetermined amount in the direction shown by the arrow in the figure. This causes the shutter blades 110, 120 to be swingingly retracted so that the cutouts 112B and 122B of the shielding portions 112, 122 correspond to the opening 1C thereby removing the shielding of the opening (i.e., a shutter is opened and a light path is created). Then, after a predetermined time (exposure time) has passed, the pulse motor 2 is rotated the same amount in the reverse direction. The shutter blades 110, 120 are returned to their initial state (covering state) and the opening 1C is shielded. (i.e., the shutter is closed and there is no light path).

As constructed above, although the radius of the pitch circle of the inside rack gear 113A and that of the outside rack gear 123A are different from each other, this would not cause any problem in practical use.

Figure 6:
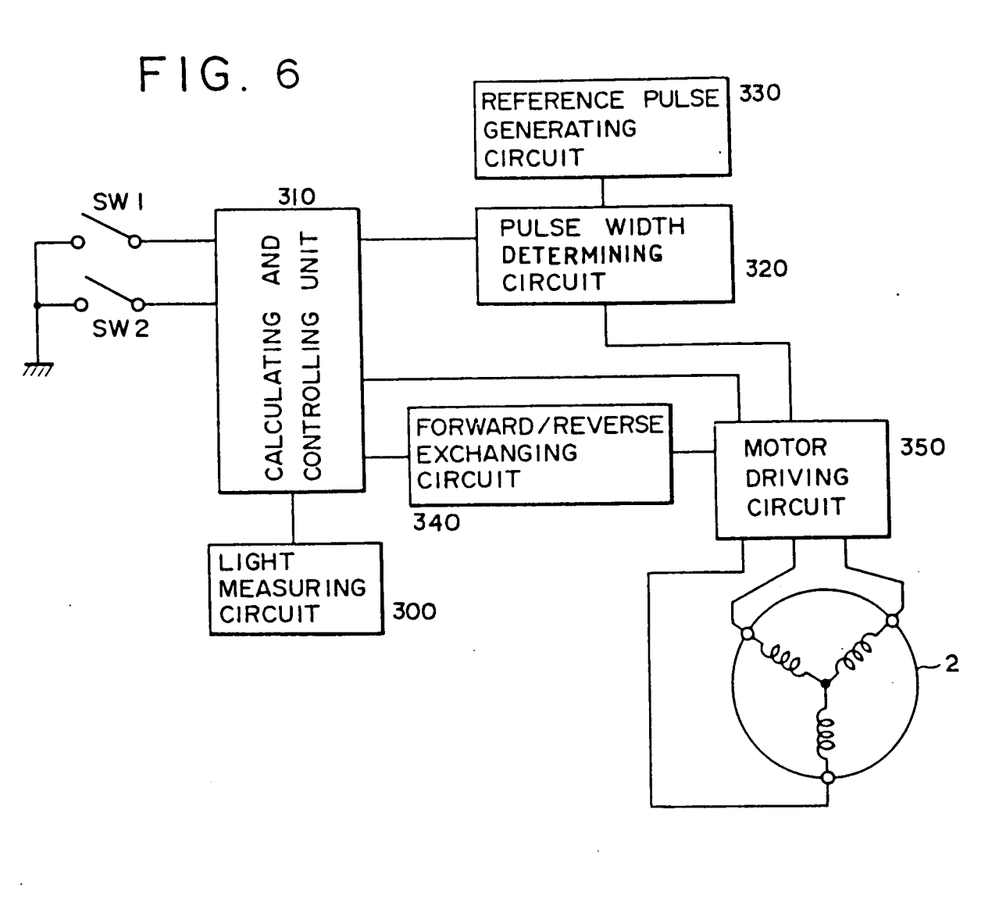
FIG. 6 is a block diagram for controlling a pulse motor according to the present invention.
Figure 7:
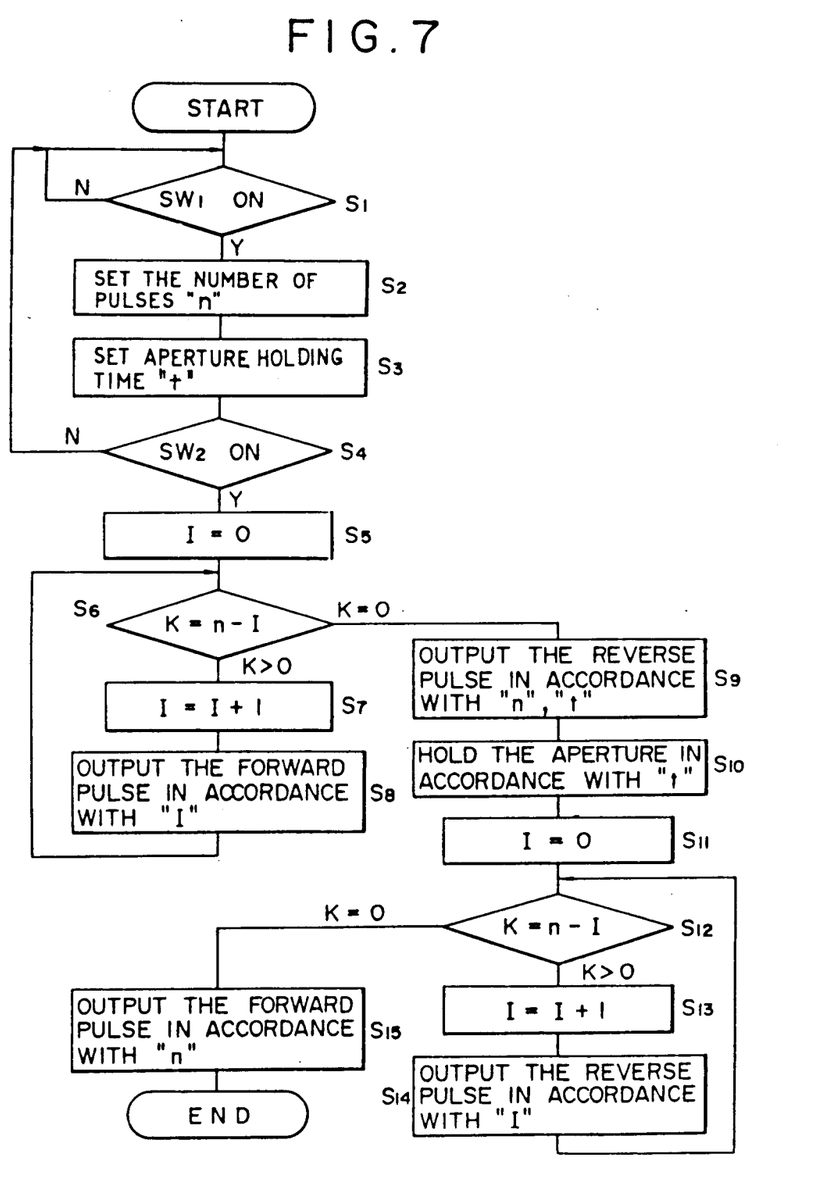
FIG. 7 is a flowchart for explaining the operation of the pulse motor according to the present invention and FIGS. 8 and 9 are diagrams showing examples of patterns for adjusting a pulse width according to the present invention and the modification thereof.

FIG. 6 is a block diagram of a drive control circuit of the above pulse motor 2, and FIG. 7 is a flowchart showing a control operation of the motor 2.

As shown in FIG. 6, a light measuring switch SW1, a release switch SW2, a light measuring circuit 300, and a calculating and controlling unit 310 are provided for the drive control of the pulse motor 2. When the switch SW1 is turned on, the calculating and controlling unit 310 sets a pulse number corresponding to an opening (aperture) and sets an aperture holding time based on data from the light measuring circuit 300. When the switch SW2 is turned on, the calculating and controlling unit 310 controls an output pulse and causes various command signals to be outputted. A pulse width determining circuit 320 subharmonizes a reference pulse from a reference pulse generating circuit 330, and produces a plurality of predetermined different pulse widths, and selects one of the predetermined or set pulse widths based on a command from the above calculating and controlling unit 310. Pulse width determining circuit 320 then applies, the selected pulse width to a motor driving circuit 350. A forward/reverse exchanging circuit 340 is provided for applying a pulse phase change signal to the motor driving circuit 350 in response to a command from the calculating and controlling unit 310. Corresponding to whether the pulse motor 2 is to be rotated in the forward direction or in the reverse direction, the motor driving circuit 350 changes the phase (that is, the order) of the pulses applied to a pulse motor 2 into the forward or reverse phase based upon the pulse phase change signal from the forward/reverse exchanging circuit 340. Thus as determined by the forward/reverse exchanging circuit 340 and the motor driving circuit, the pulse motor 2 is rotated in forward or reverse direction.

Note that the pulse widths are preset taking the inertia, friction and the like of the motor into account.

Next, an operating flowchart of the above pulse motor drive control circuit will be described below with reference to FIG. 7.

First step $S_1$, it is examined whether the light measuring switch SW1 is turned on or off steps $S_2$ and $S_3$. When it is turned on, the number of pulses "n" corresponding to an aperture value and an aperture holding time "t" are set based on an output from the light measuring circuit 300. Thereafter (step $S_4$), it is examined whether the release switch SW2 is turned on or off. When it is turned off, the process goes back to step $S_1$; when it is turned on, a variable I for indicating the count of the number of pulses is set to 0 (step $S_5$). Next, a difference K between the pulse number of pulses "n" corresponding to an aperture value and a count value I of the actual number of pulses is obtained and the difference K is examined whether $K>0$ or $K=0$ (in step $S_6$). When $K>0$, I is incremented by 1 (in step $S_7$) and a command for selecting a forward rotation pulse in accordance with I is applied to the pulse width determining circuit 320 (in step $S_8$). Thereafter, a loop from steps $S_6$ through $S_8$ is repeated until $K=0$.

If $K=0$, a reverse rotation pulse corresponding to "n" and "t" is outputted in response to a signal from the forward/reverse exchanging circuit 340 (step $S_9$) to apply a pulse for keeping a set time and aperture in accordance with "t" to the drive circuit 350 (in step $S_{10}$).

Next, to count pulses when the aperture is being closed, the variable I is set to 0 (in step $S_{11}$) and then a difference between a set pulse number K and a count value I is examined (in step $S_{12}$). When $K>0$, I is incremented by 1 (in step $S_{13}$) and a reverse rotation pulse corresponding to I is outputted, and when $K=0$, a forward rotation pulse according to "n" is outputted (in step $S_{15}$), whereby a series of the shutter operation is completed.

Figure 8:
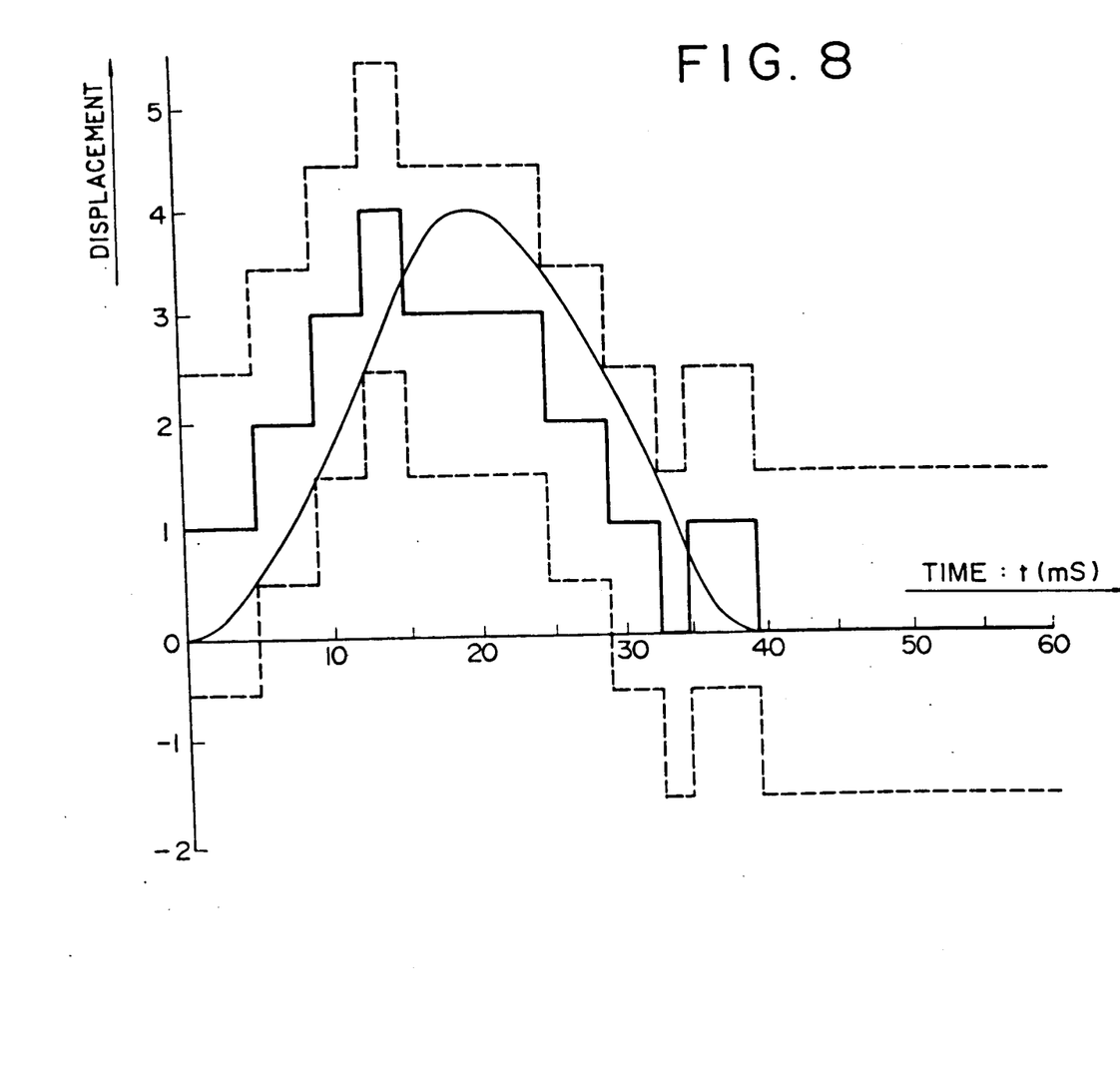

FIG. 8 shows an example of adjusting pattern of pulse widths applied to the pulse motor 2. As shown in FIG. 8, the operating time is shortened such that the respective pulse widths are made longer at the beginning and then gradually shortened after they have been accelerated within a range in which no step out is caused (delay of 1.5 pulse minute or more; shown by the dotted lines). In addition, when pulses applied to the motor 2 are changed from forward rotation pulses to reverse rotation pulses, the final pulse of the forward rotation pulses (a fourth pulse in the figure) is shortened, and reverse rotation pulses are applied at once, whereby inertia is harmonized with a braking force due to the reverse rotation to prevent overrunning. In addition, a braking force is applied by making the final pulse at the completion of the operation pulse a forward rotation pulse to prevent rebounding of the shutter blades (the blades 10, 20, for example).

Figure 9:
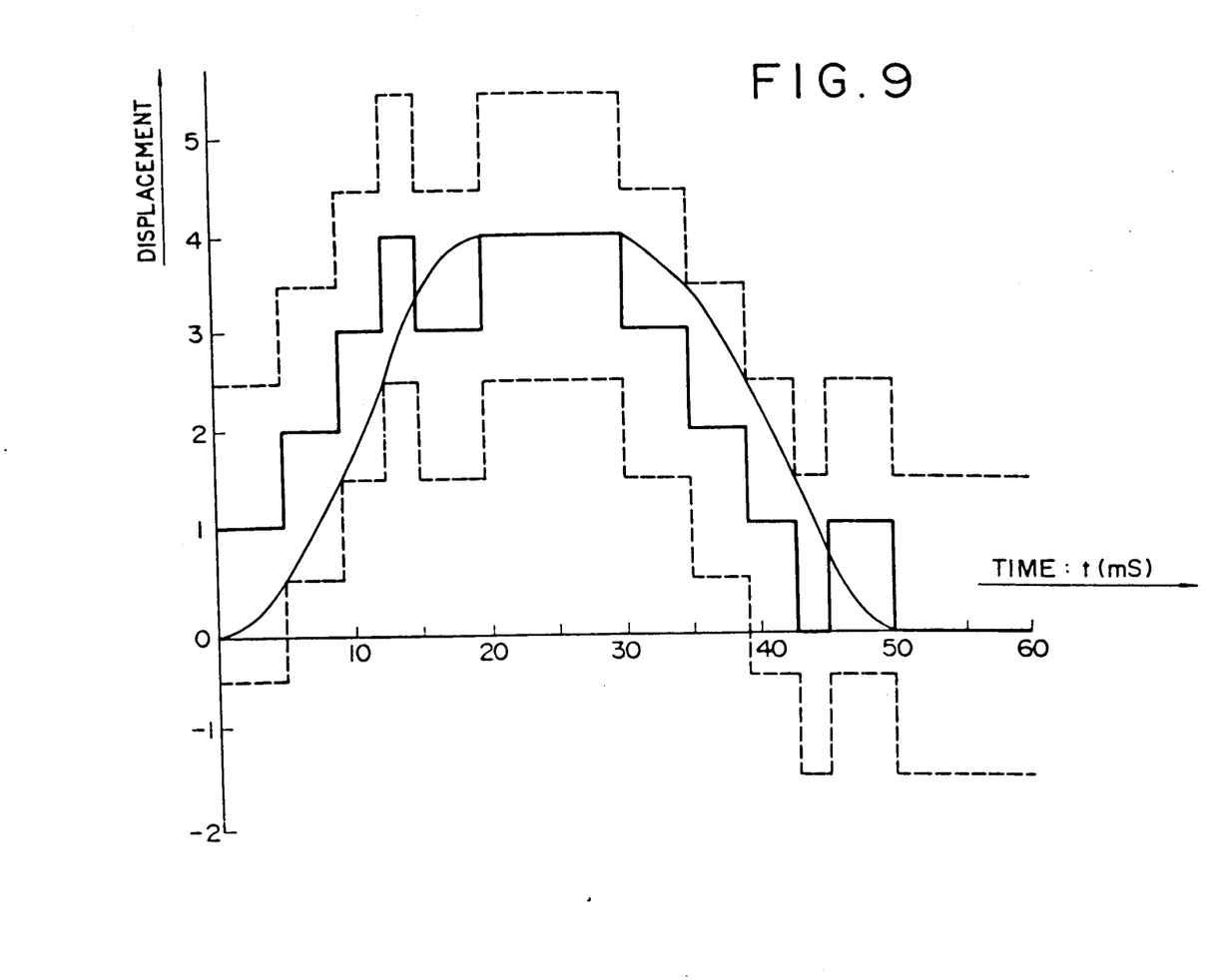

FIG. 9 shows a modification of a pulse width adjusting pattern according to the present invention. More specifically, FIG. 9 shows a case in which an opening of an set aperture must be kept for a certain period of time and thus the final pulse of forward pulses are shortened and reverse pulses are applied at once, and then forward pulses of a predetermined pulse width are applied again when the shutter blades forming the aperture are to be held open.

Although the examples shown in FIGS. 8 and 9 have the respective pulse widths set in the vicinity of the step out boundary (in the vicinity of 1.5 pulses), they may be set to, for example, a pulse width taking a safety factor into consideration.

A shutter mechanism according to the present invention is applied not only to the embodiments shown in FIGS. 1 through 6, but also to any shutter mechanism using a pulse motor. Further, the flowchart shown in FIG. 7 may be changed, as necessary.

As described above, according to the present invention, since each pulse width of drive pulses applied to a pulse motor is adjusted in a shutter using the pulse motor, the shutter can be actuated in the shortest possible time which does not cause step out so that the shutter can be actuated at an increased speed. In addition, a stable set aperture can be obtained without causing overrunning when the set aperture is opened, and rebounding when the shutter is closed.

What is claimed is:

1. A shutter mechanism for a camera for opening and closing a light path, comprising:
    a pair of plate members, pivoted about the same point, which are swingingly driven to their operative positions between positions where said plate members completely shield said light path and positions where said plate members allow light to pass through said light path, each of said plate members having a gear portion;
    driving means for supplying a driving force to drive said plate members; and
    gear means arranged between said driving means and said pair of plate members for transmitting said driving force to said gear portions of said plate members.

2. The shutter mechanism according to claim 1, which further comprises control means for driving said driving means in order to move said plate members to and from certain operative positions based upon an aperture value and to maintain said plate members of said certain operative positions for a period of time corresponding to an exposure time.

3. The shutter mechanism according to claim 2, wherein said plate members are capable of being moved toward and away from each other as they are moved to and from their operative positions.

4. The shutter mechanism according to claim 3, wherein at least one of said plate members has said gear portion at an edge thereof.

5. The shutter mechanism according to claim 3, wherein at least one of said plate members has an opening, said gear portion being provided at the inner periphery of said opening.

6. The shutter mechanism according to claim 3, wherein either of the center of a pitch circle of each of said gear portions being is the point where each of said plate members is pivoted.

7. The shutter mechanism according to claim 6, wherein the radii of each of the pitch circles of said gear portions of each of said plate members are equal.

8. The shutter mechanism according to claim 2, wherein said driving means comprises a pulse motor, and wherein said control means applies a drive pulse to said pulse motor.

9. The shutter mechanism according to claim 8, wherein said control means includes means for varying the width of each of the pulses to be applied to said motor in such a manner that a pulse of relatively large width is applied at the beginning of the revolution of said motor, thereafter and pulses of relatively small width are applied.

10. The shutter mechanism according to claim 9, wherein said pulses' widths are varied by said control means to become small gradually, until said two blades members are located at operative positions corresponding to a desired aperture value.

11. The shutter mechanism according to claim 10, wherein said control means applies a reverse rotation pulse having a predetermined width at the end of the revolution of said motor in one direction for preventing said motor from overrunning.

12. The shutter mechanism according to claim 11, wherein said control means applies a holding pulse when said plate members are located at certain operative positions in order to hold said plate members at said certain operative positions for a period of time corresponding to the exposure time.

13. A camera including a two-blade shutter mechanism comprising:
    a pulse motor for driving two blade members of said two-blade shutter mechanism; and
    control means for varying the width of the pulses applied to said motor in such a manner that a pulse of relatively large width is applied at the beginning of the revolution of said motor, and thereafter pulses of relatively small width are applied.

14. The camera according to claim 13, wherein said control means applies pulses having widths which are varied to become small gradually, until said two blade members are located at operative positions corresponding to a desired aperture value.

15. The camera according to claim 14, wherein said control means applies a reverse rotation pulse having a predetermined width at the end of the revolution of said motor in one direction for preventing said motor from overrunning.

16. The camera according to claim 15, wherein said control means applies a holding pulse when said blade members are located at certain operative positions in order to hold said blade members at said certain operative positions for a period of time corresponding to the exposure time.

* * * * *

UNITED STATES PATENT AND TRADEMARK OFFICE
CERTIFICATE OF CORRECTION

PATENT NO. : 5,040,017

DATED : August 13, 1991

INVENTOR(S) : A. ARAI

It is certified that error appears in the above-indentified patent and that said Letters Patent is hereby corrected as shown below:

On the cover, in item [56], under U.S. PATENT DOCUMENTS, insert ---4,893,142 1/1990 Ishida et al. 354/262---.

On the cover, in item [56], under U.S. PATENT DOCUMENTS, insert ---4,768,051 8/1988 Sasaki 354/400---.

On the cover, in item [56], under FOREIGN PATENT DOCUMENTS, insert ---60-254027 12/1985 Japan---.

On the cover, in item [56], under FOREIGN PATENT DOCUMENTS, insert ---1-79030 5/1989 Japan---.

On the cover, in item [56], under FOREIGN PATENT DOCUMENTS, insert ---1-101228 7/1989 Japan---.

On the cover, in item [56], under FOREIGN PATENT DOCUMENTS, insert ---1-101229 7/1989 Japan---.

On the cover, in item [56], under FOREIGN PATENT DOCUMENTS, insert ---1-101231 7/1989 Japan---.

On the cover, in item [56], under FOREIGN PATENT DOCUMENTS, insert ---1-101232 7/1989 Japan---.

UNITED STATES PATENT AND TRADEMARK OFFICE
CERTIFICATE OF CORRECTION

PATENT NO. : 5,040,017

DATED : August 13, 1991

INVENTOR(S) : A. ARAI

It is certified that error appears in the above-indentified patent and that said Letters Patent is hereby corrected as shown below:

On the cover, in item [56], under FOREIGN PATENT DOCUMENTS, insert ---1-101230 7/1989 Japan---.

On the cover, in item [56], under FOREIGN PATENT DOCUMENTS, insert ---2212623 7/1989 United Kingdom---.

On the cover, in item [56], under FOREIGN PATENT DOCUMENTS, insert ---2199414 7/1988 United Kingdom---.

On the cover, in item [56], under FOREIGN PATENT DOCUMENTS, insert ---1466369 3/1977 Great Britain---.

At column 10, line 8, (claim 8, line 6), change "thereafter and" to ---and thereafter---.

Signed and Sealed this

Twelfth Day of December, 1995

Attest:

*Bruce Lehman*

BRUCE LEHMAN

*Attesting Officer*　　　Commissioner of Patents and Trademarks